Jan. 11, 1966 E. D. BENNETT 3,228,262
METHOD OF MAKING A DIE SET
Filed Dec. 10, 1963 5 Sheets-Sheet 1

INVENTOR.
EDWARD D. BENNETT
BY
ATTORNEY

Jan. 11, 1966    E. D. BENNETT    3,228,262
METHOD OF MAKING A DIE SET
Filed Dec. 10, 1963    5 Sheets-Sheet 3

INVENTOR.
EDWARD D. BENNETT
BY
ATTORNEY

Jan. 11, 1966  E. D. BENNETT  3,228,262
METHOD OF MAKING A DIE SET
Filed Dec. 10, 1963  5 Sheets-Sheet 4
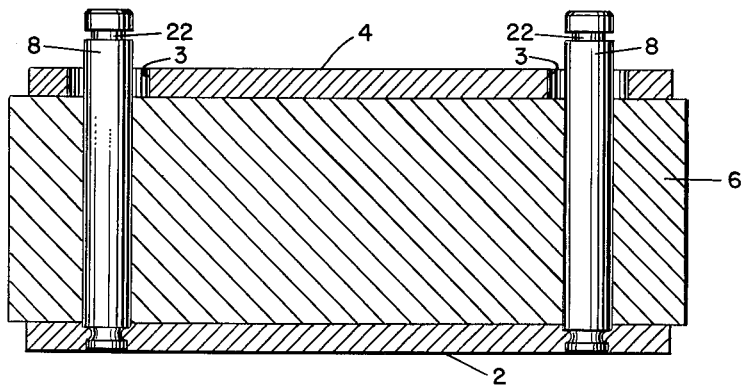
FIG. 8
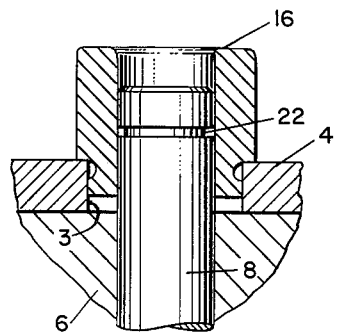
FIG. 9
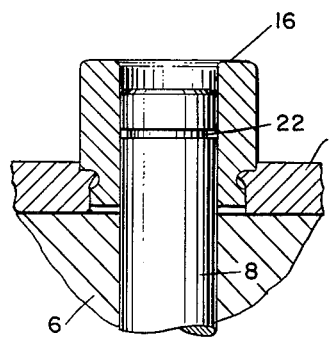
FIG. 10
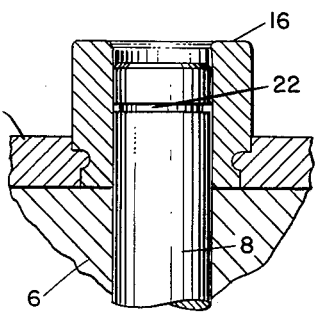
FIG. 11
FIG. 12
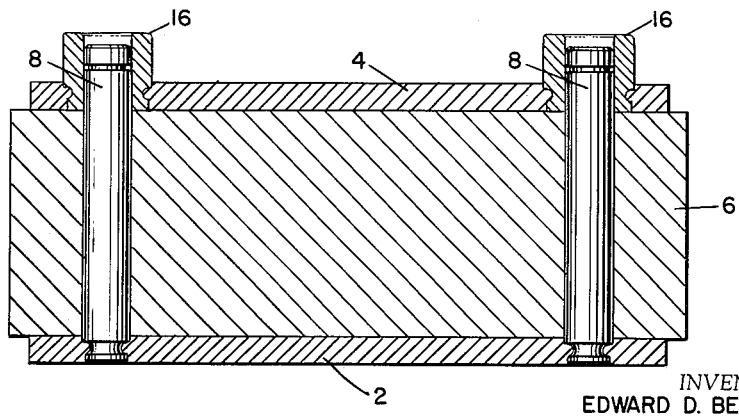
INVENTOR.
EDWARD D. BENNETT
BY
ATTORNEY Jan. 11, 1966  E. D. BENNETT  3,228,262

METHOD OF MAKING A DIE SET

Filed Dec. 10, 1963  5 Sheets-Sheet 5

*INVENTOR.*
EDWARD D. BENNETT

BY
ATTORNEY

United States Patent Office

3,228,262
Patented Jan. 11, 1966

3,228,262
METHOD OF MAKING A DIE SET
Edward D. Bennett, Union, N.J., assignor to Minnie Punch and Die Corporation, a corporation of New Jersey
Filed Dec. 10, 1963, Ser. No. 329,501
1 Claim. (Cl. 76—107)

This invention relates generally to punching die sets and more particularly to punching die sets for use on the stamping of relatively thin material.

In the early days of mass-produced stamped parts, tolerances and alignment requirements for dies making crude blanks and forms were not critical. The early die set was an open set which had no built-in guidance or alignment means and thus depended on the accuracy of the press itself to maintain alignment. It was necessary either to have accurate presses for close tolerance work, or to compomise on the quality and uniformity of the parts produced. Through an evolutionary process the modern die set came into being.

The first die set to be self-aligning was made with two cast or steel ground plates which were strapped together and through-bored for two or more shafts. Shafts were pressed in one plate and were guided through the holes in the second plate, which were lapped for a sliding fit.

As time progressed, bosses were cast on the upper plate (Cast Die Sets) or were welded (in the case of steel die sets) to give added length to the bored holes, thereby improving alignment.

The next improvement was the development of inserted guide bushings, usually pressed in with an interference fit and lapped to fit the guide pins (shafts). This, basically is the die set now in use.

The conventional punching die set is a large, heavy tool, massive in structure and extremely heavy and awkward to handle. One example is illustrated by U.S. Patent No. 2,359,682 for a Punch Press Die. Another example is illustrated by U.S. Patent No. 1,468,271 of September 18, 1923 for Mechanism for Making Printing Strip Holders. It may be seen by comparing the two above listed patents that the conventional die set has not changed significantly since 1923. A large portion of the manufacturing expense of a conventional die set occurs in the manner of accurately securing the guide pins and guide bushings to the die set and is due in part to the accurate machining necessary on the die set plates and on the guide pins and bushings which are required to provide accurate movement of the die set plates relative to each other. One example is shown in U.S. Patent No. 2,017,247 for Tool Attachment. A skilled craftsman is required merely to set up the die set for operation in a punch press.

In the conventional die set the shank of the punch holder is clamped to the ram of a punch press while in the instant invention there is no connection between the die set and the punch press itself.

There is a great need for punching die sets which may be economically manufactured and assembled and which yet accurate in punch placement, capable of withstanding production runs, easily disassembled and easily set up for operation. It is therefore the purpose of this invention to provide the answer to this long sought need.

The prime object of the present invention is to provide an improved punching die set.

A more specific object of the present invention is to provide a punching die set for short to medium run production stampings of 1000 to 100,000 pieces which is economical to manufacture and simple to assemble and use.

Another object is to provide a punching die set which may be quickly set up and placed in operation.

Another object of the invention is to provide a self-aligning die set which retains its accuracy independent of any variation in the drive of the punch press.

Still another object of the invention is to provide a die set which may be quickly disassembled for sharpening of the punch and die edges.

Another object is to provide a die set that requires minimum storage space.

One feature of the invention is the use of stamped parts for the punch plate and die plate of the die set.

Another feature of the invention is the use of a master plate to accurately align and secure a guide pin in the punch plate and a guide bushing in the die plate.

Another feature of the invention is the use of guide pins and bushings having a head and shoulder of different diameters with an arcuate collar between the head and shoulder so that by forcing the guide pin or bushing into a relatively soft plate the plate material will flow to fill the collar and thereby secure the guide pin or bushing to the plate in which the punch or die member is forced.

Another feature of the invention is the use of snap retaining rings to assemble the die set in such a manner as to permit rapid disassembly of the die set for sharpening of the punches or for other purposes.

Another feature of the invention is the use of supports with the die set for ease in setting up the die set for operation in a punch press.

These and other objects and novel features of the invention are set forth in the appended claims and the invention as to its organization and its mode of operation will best be understood from a consideration of the following detailed description of the preferred embodiment when used in connection with the accompanying drawings which are hereby made a part of the specification and in which:

FIGS. 8–12 illustrate mounting of the guide bushings in the die plate.

In the present invention which will now be described it should be realized that the great departure from the conventional structure of a punching die set provides not only great structural novelty but a significant step in reducing the size, weight, skill and time involved in producing an accurate punching die set.

Figure 3:
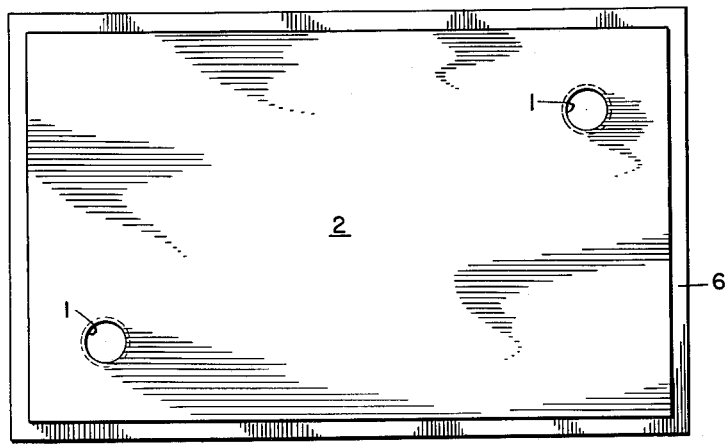
FIG. 3 illustrates a typical punch plate stamping.

In carrying out the present invention the die set is formed by stamping two plates 2 and 4 from a relatively soft material such as aluminum. The stamping will include holes 1 placed approximately where the guide pins and bushings are desired as seen in FIGS. 3, 4 and 5.

Figure 4:
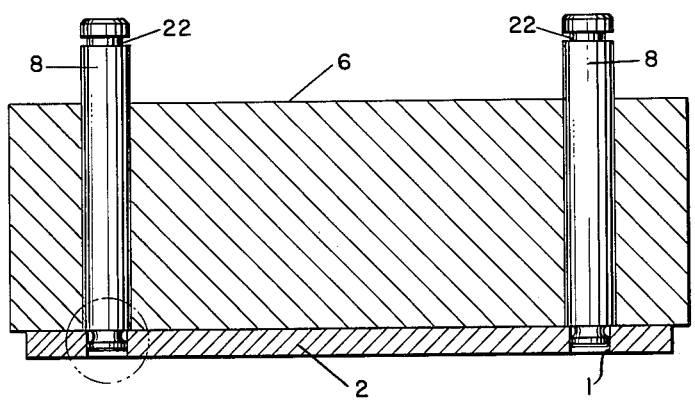
FIGS. 4–7 illustrate mounting of the guide pins in the punch plate.
Figure 5:
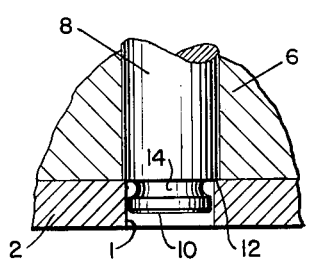
Figure 6:
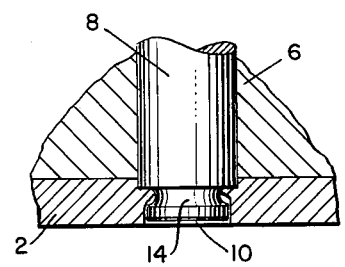
Figure 7:
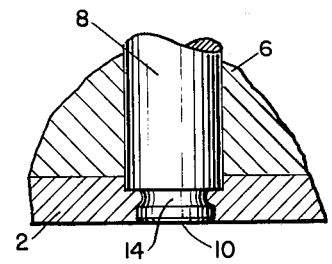

By placing the punch plate stamping 2, as in FIG. 4 under the master plate 6 one or more guide pins 8 having a head 10 and shoulder 12 of different diameters with an intermediate arcuate collar 14 is inserted into an aperture in the master plate to accurately align the guide pin with the hole in the punch plate. By pressing the guide pins into the punch plate 2 the plate material distorts as shown in FIGS. 6 and 7 and flows into the arcuate collar area and thereby accurately secures the guide pin or pins 8 in the punch plate 2. The guide pin collar may be of a form other than arcuate, but the curved collar appears to provide a more secure seal between the pin and the plate. The next step is to place the die plate 4 over the guide pins 8 as in FIG. 8. By placing the guide bushing 16 over the pin 8 as seen in FIGS. 9–12 and applying pressure, the guide bushing 16 is accurately secured to plate 4 as the plate material distorts and flows around the collar of the die.

Figure 13:
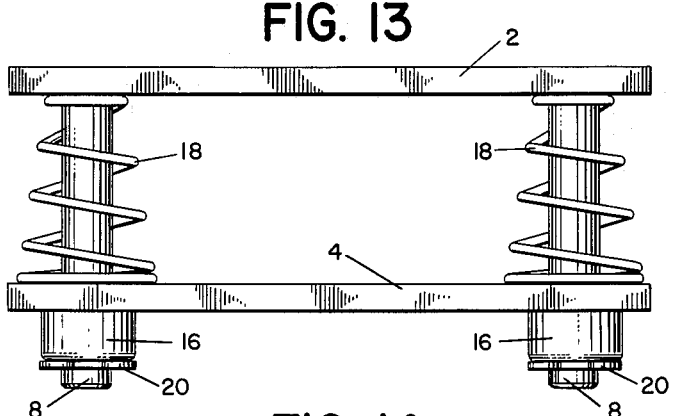
FIG. 13 is an elevation of the assembled die set.
Figure 14:
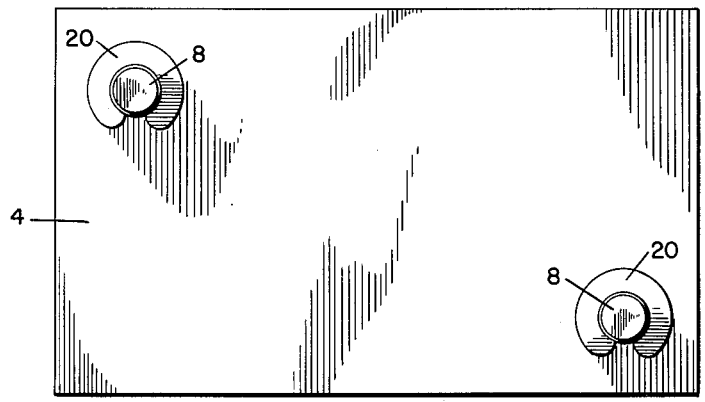
FIG. 14 is a bottom view of FIG. 13.

By withdrawing the punch plate 2 with its associated guide pins 8, the master block may then be removed. As seen from FIGS. 13 and 14 the plates 2 and 4 may be separated, turned over, compression springs 18 placed over the pins 8 which are then inserted in the bushing 16 and snap retaining rings 20 are then hand placed in the groove 22 of pin 8. When it is desired to disassemble the die set, removal of the retaining rings is all that is required. It is thus seen that the die set is held open by means of the springs which force the die plate against the snap retaining rings. The placement of two or more guide pins and snap retaining rings in the manner described above, provides accurate plate alignment, and the snap retaining rings provide for easy dismantling for purposes of sharpening the punches, grinding the die members or any other necessary maintenance which may be needed.

To repeat, the method of forming the punching die set comprises the steps of stamping the punch plate, stamping the die plate, placing a master block over the punch plate and placing the guide pins through apertures in the master block so as to rest proximate apertures on the punch plate. Any number of guide pins may be used with two diagonal pins preferred. The guide pins have a head, a shank shoulder or body of slightly larger diameter and an arcuate collar or neck between the head and shoulder. When pressure is applied to the guide pins at the end opposite the punch plate the guide pins are forced accurately into the punch plate, guided by the apertures in the master block. The guide pins, upon entering the punch plate distort and flow some of the punch plate material into the arcuate collar of the guide pin and thereby secure the two together. In the preferred embodiment of the invention guide bushings are utilized which also have a head, a slightly larger shoulder and an arcuate collar between the head and shoulder.

The stamped die plate is then placed upon top of the master block so that the just secured guide pins pass through apertures in the punched die plate. Guide bushings are then passed over the protruding guide pins and pressure is applied to the guide bushings so as to accurately secure the guide bushing to the die plate by distorting and flowing die plate material into the collar of the guide bushing. The master block holds the guide pins in the proper aligned position during this step of assembly.

The punch plate with attached guide pins is then withdrawn from the die plate and master block and springs placed over the guide pins, the die plate replaced on the guide pins, the springs compressed by applying pressure to the die plate and a locking ring placed in a groove near the end of each guide pin. Removal of pressure from the die plate allows the springs to expand and press the die and punch plates apart to the limit of the guide pins so the die set assumes its normal open configuration.

Figure 1:
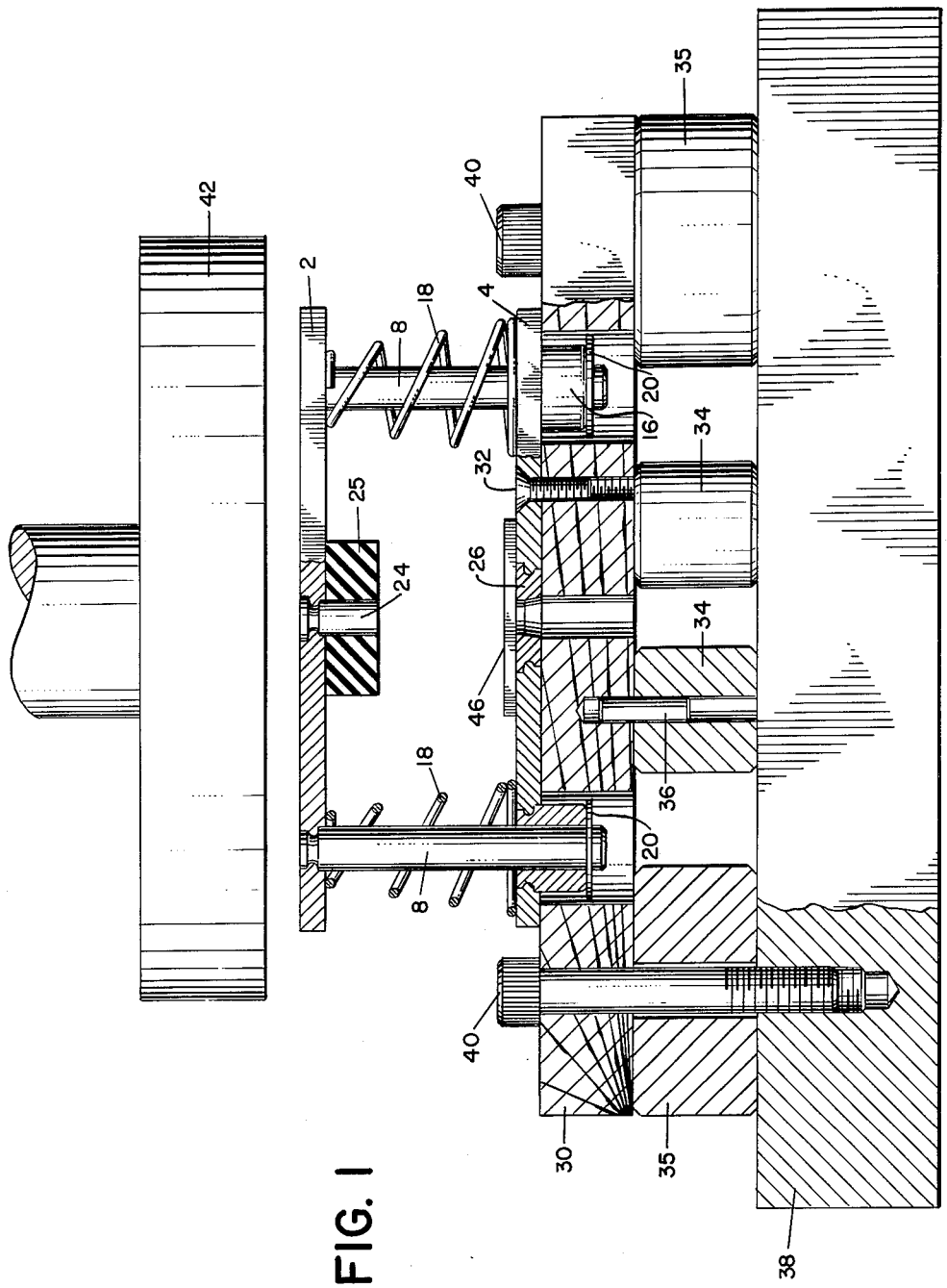
FIG. 1 is a partial cross-section view of the punching die set of the invention in the open position.
Figure 2:
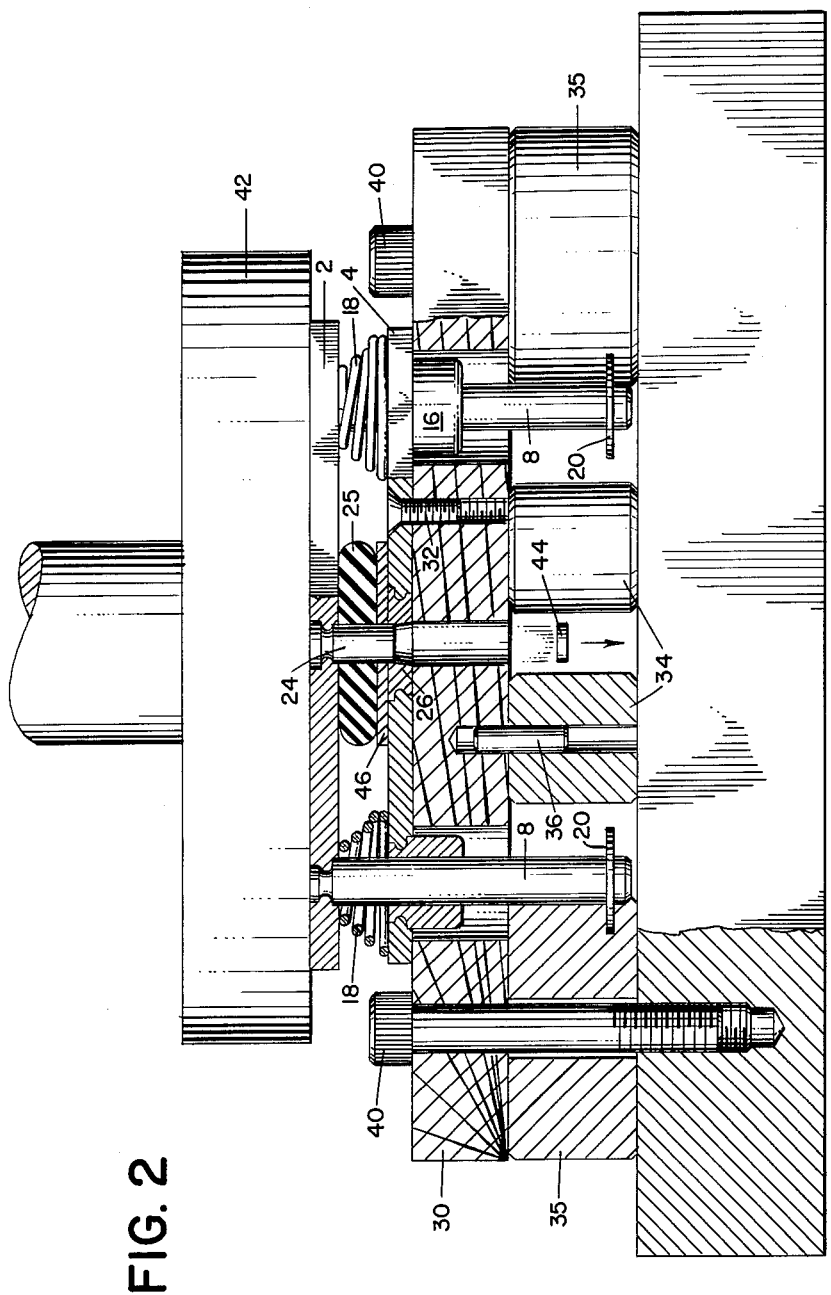
FIG. 2 is a partial cross-section of FIG. 1 in the closed position.

An assembled punching die set is shown in FIG. 1 in the open position. In FIG. 1 the punch plate 2 and die plate 4 are separated and aligned by guide pins 8. The punch plate 2 may include punches one of which is shown as 24 while the die plate 4 has mounted thereon guide bushings 16 and die members one of which is shown at 26 for matingly receiving the punch 24. Stripper 25 is a reliant material for ejecting the piece part from the punch. The die plate 4 is mounted to the fibre mount block 30 by mounting member 32. The support blocks 34 are mounted by press fit pins 36 to the bottom of mount 30 so as to provide backing support for the die set and to provide clearance for the punched slugs to fall free of the die set. The die set with support blocks in place is secured to the bolster block 38 by connecting bolt 40 which passes through support mounting block 35. The piece part to be punched, 46, is then placed in the die set. The die set in place is then compressed as in FIG. 2 by the punch press ram forcing the ram block 42 onto the punch plate. The ram block prevents the punch from being forced out. It may be seen from FIG. 2 that the slug 44 may fall free between supports 34 after the punching stroke. When the punch press ram returns to its up position the die set returns to its normally expanded position by the action of springs 18. It should be noted that the die set is not connected to the ram and that by the action of the guide pins, the die set is self-aligning.

It is thus seen that an improved die set is provided which may be easily and quickly set up with less skill than required in the set up of a conventional punching die set. Set up of the die set of this invention is accomplished by securing the die plate to the mount block 30, inserting the pinned supports 34 into the mount block 30 and bolting the mount block through a support mounting block 35 to the bolster block 38. Since the die set is self-aligning on its own guide pins, the above procedure represents the complete set up procedure.

It should be understood that this invention is not limited to specific details of construction and arrangement thereof herein illustrated, and that changes and modifications may occur to one skilled in the art without departing from the spirit of the invention; the scope of the invention being set forth in the following claim.

What is claimed is:

The method of forming a die set comprising the steps of stamping a punch plate and a die plate each having perforations, placing an apertured master block over the punch plate, placing guide pins having grooves adjacent opposite ends through the master block apertures to rest proximate the perforations in the punch plate, forcing the guide pins into the perforations in the punch plate to flow the punch plate material into the groove adjacent one end of the pins whereby the guide pins are secured to the punch plate, placing the die plate on top of the master block over the ends of the guide pins opposite the punch plate so that the guide pin ends extend through the perforations in the die plate and protrude above the die plate, placing grooved guide bushings over the ends of the guide pins, forcing the guide bushings toward the die plate to flow the die plate material into the groove in the guide bushings, removing the die plate and bushings from the guide pins, removing the master block from the guide pins, inserting compression springs over one or more of the guide pins, replacing the die plate and bushings over the guide pins, applying a force to compress the springs and move the die and punch plates toward each other, inserting a locking ring into the guide pin groove on the projecting end of the pins above the die plate and bushings, and removing the compressing force whereby the die set assumes a configuration of parallel punch and die plates extended by the springs to the extent allowed by the locking rings.

References Cited by the Examiner

UNITED STATES PATENTS

| 1,584,371 | 5/1926 | Griffiths | 83—13 |
| 1,715,972 | 6/1929 | Woodward et al. | 83—685 |
| 1,939,478 | 12/1933 | Whistler | 83—685 |
| 2,495,221 | 1/1950 | Berlin | 76—107 |
| 2,789,639 | 4/1957 | Lorentzen | 83—13 |
| 2,821,871 | 2/1958 | Sarno | 76—107 |

GRANVILLE Y. CUSTER, Jr., *Primary Examiner.*

ANDREW R. JUHASZ, *Examiner.*